(12) United States Patent
Whitmer et al.

(10) Patent No.: US 11,880,476 B1
(45) Date of Patent: Jan. 23, 2024

(54) FILEKEY ACCESS TO DATA

(71) Applicant: EMC IP Holding Company LLC, Hopkinton, MA (US)

(72) Inventors: Ray D. Whitmer, Pleasant Grove, UT (US); David S. Anderson, Salt Lake City, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 385 days.

(21) Appl. No.: 16/588,016

(22) Filed: Sep. 30, 2019

Related U.S. Application Data

(63) Continuation of application No. 14/319,998, filed on Jun. 30, 2014, now Pat. No. 10,430,599.

(51) Int. Cl.
| | | |
|---|---|---|
| *H04L 29/06* | (2006.01) | |
| *G06F 21/62* | (2013.01) | |
| *H04L 9/08* | (2006.01) | |
| *G06F 16/174* | (2019.01) | |

(52) U.S. Cl.
CPC ........ *G06F 21/6218* (2013.01); *G06F 16/174* (2019.01); *H04L 9/0861* (2013.01)

(58) Field of Classification Search
CPC ... G06F 21/6218; G06F 16/174; H04L 9/0861
See application file for complete search history.

(56) References Cited

U.S. PATENT DOCUMENTS

| | | |
|---|---|---|
| 6,353,889 B1 | 3/2002 | Hollingshead |
| 6,910,628 B1 | 6/2005 | Sehr |
| 6,934,839 B1 | 8/2005 | Pagel |
| 6,970,565 B1 * | 11/2005 | Rindsberg ............... G06F 21/57 380/270 |
| 7,178,021 B1 * | 2/2007 | Hanna ................... H04L 9/0825 713/150 |
| 2003/0115251 A1 | 6/2003 | Fredrickson et al. |
| 2003/0172279 A1 | 9/2003 | Yudasaka |
| 2004/0156508 A1 | 8/2004 | Tada et al. |
| 2005/0065943 A1 | 3/2005 | Miyata et al. |
| 2005/0071646 A1 | 3/2005 | Hollingshead |

(Continued)

OTHER PUBLICATIONS

Michaelvrable et al., Cumulus: Filesystem Backup to the Cloud, Dec. 14, 2009, ACM, vol. 5 Issue 4, pp. 14:1-14:28. (Year: 2009).*

(Continued)

*Primary Examiner* — Jeffrey C Pwu
*Assistant Examiner* — Fahimeh Mohammadi
(74) *Attorney, Agent, or Firm* — Workman Nydegger

(57) ABSTRACT

Systems and methods for backing up data are provided. Data objects or blocks of data can be encrypted with individualized keys. The keys are generated from the unencrypted data objects or blocks. The encrypted data objects or blocks and fingerprints of the encrypted data objects or blocks can be uploaded to a datacenter. Even though the data objects or blocks are encrypted, deduplication can be performed by the datacenter or before the data object is uploaded to the datacenter. In addition, access can be controlled by encrypting the key used to encrypt the data object with access keys to generate one or more access codes. The key to decrypt the encrypted data object is obtained by decrypting the access code.

9 Claims, 8 Drawing Sheets

(56) References Cited

U.S. PATENT DOCUMENTS

| | | | |
|---|---|---|---|
| 2005/0177742 A1* | 8/2005 | Benson | G06F 21/6236 |
| | | | 713/189 |
| 2009/0125719 A1 | 5/2009 | Cochran et al. | |
| 2010/0198730 A1* | 8/2010 | Ahmed | G06F 21/31 |
| | | | 380/278 |
| 2010/0303282 A1 | 12/2010 | Boyd et al. | |
| 2010/0325732 A1 | 12/2010 | Mittal et al. | |
| 2011/0022642 A1 | 1/2011 | Demilo et al. | |
| 2011/0058673 A1 | 3/2011 | Zheng et al. | |
| 2011/0179286 A1* | 7/2011 | Spalka | H04L 9/0869 |
| | | | 713/189 |
| 2012/0271854 A1 | 10/2012 | Truong et al. | |
| 2013/0101113 A1 | 4/2013 | Cannon et al. | |
| 2013/0136258 A1 | 5/2013 | Grube et al. | |
| 2013/0166510 A1* | 6/2013 | Augenstein | H04L 9/3247 |
| | | | 707/640 |
| 2013/0177157 A1* | 7/2013 | Li | H04L 9/08 |
| | | | 380/277 |
| 2013/0262514 A1* | 10/2013 | Everett | G06F 21/6227 |
| | | | 707/781 |
| 2013/0268444 A1* | 10/2013 | Namgoong | H04L 63/08 |
| | | | 726/4 |
| 2014/0082749 A1* | 3/2014 | Holland | G06F 21/60 |
| | | | 726/29 |
| 2014/0115327 A1 | 4/2014 | Gorbach et al. | |
| 2014/0169554 A1* | 6/2014 | Scarisbrick | H04L 9/0894 |
| | | | 380/28 |
| 2014/0237231 A1 | 8/2014 | Spalka et al. | |
| 2015/0222606 A1* | 8/2015 | Yan | H04L 9/0847 |
| | | | 713/171 |
| 2016/0028699 A1* | 1/2016 | Ambroz | H04L 9/3242 |
| | | | 713/168 |
| 2017/0195119 A1* | 7/2017 | Roth | H04L 9/3213 |
| 2018/0314510 A1* | 11/2018 | Roy-Chowdhury | G06F 8/65 |

OTHER PUBLICATIONS

Bong Jun Ko et al., An Information-Centric Architecture for Data Center Networks, Aug. 17, 2012, pp. 79-84. (Year: 2012).*

Laszlo Toka et al., Online Data Backup: a Peer-Assisted Approach, Sep. 13, 2010, IEEE, pp. 1-10. (Year: 2010).*

Xiao Zhang et al., Ensure Data Security in Cloud Storage, Jul. 11, 2011, IEEE, pp. 284-287. (Year: 2011).*

Anthony Harrington et al., Cryptographic Access Control in a Distributed File System, Jun. 2-3, 2003, ACM, pp. 158-165.

Krishna P. N. Puttaswamy et al., Silverline: Toward Data Confidentiality in Storage-Intensive Cloud Applications, Oct. 26-28, 2011, ACM, pp. 1-13.

Ludwig Seitz et al., Key management for encrypted data storage in distributed system, Apr. 4, 2005, IEEE, pp. 1-11.

Zhiguo Wan et al., HASBE: A Hierarchical Attribute-Based Solution for Flexible and Scalable Access Control in Cloud Computing, Apr. 2012, IEEE, vol. 7, Issue: 2, pp. 743-754.

* cited by examiner

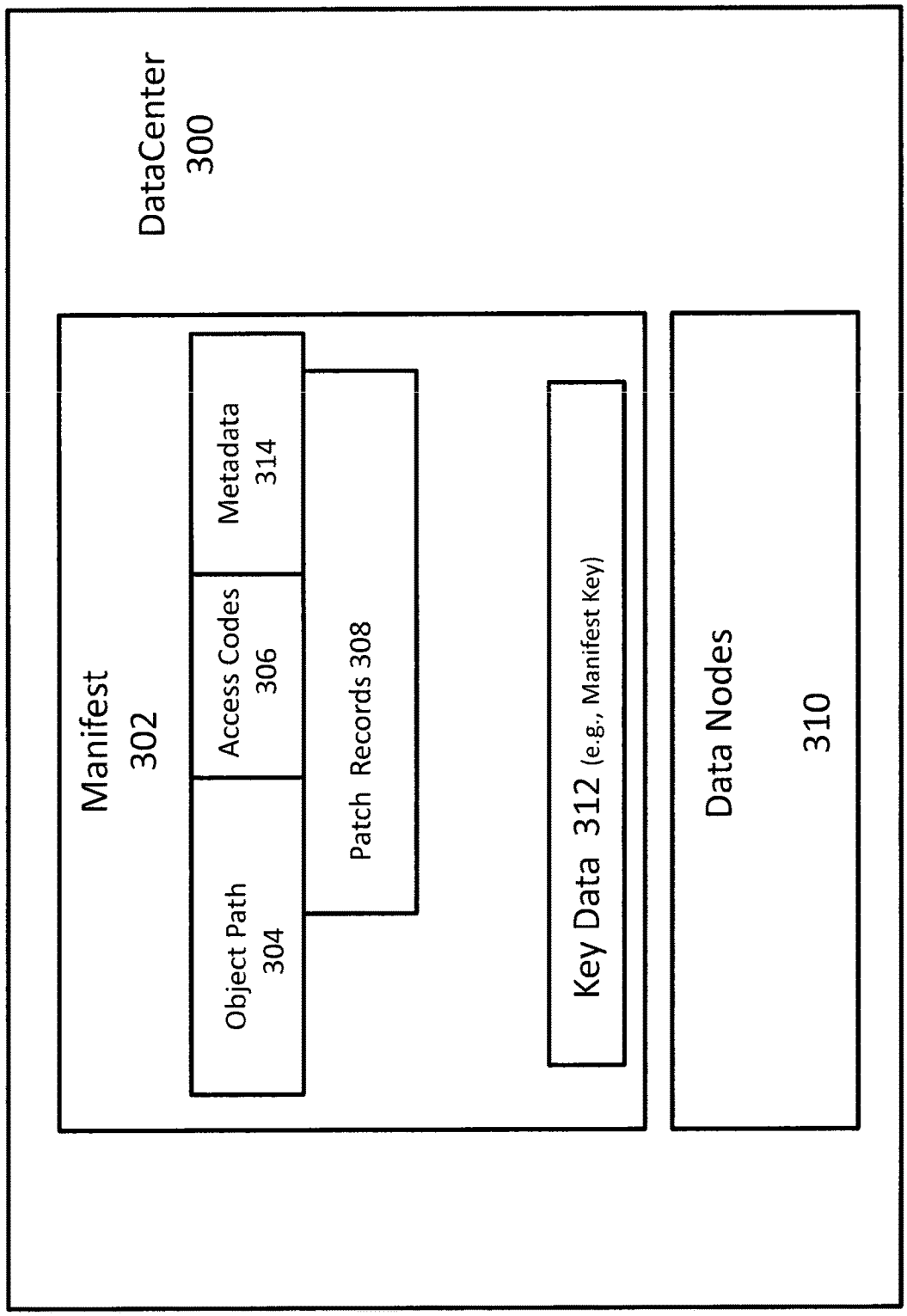

FILEKEY ACCESS TO DATA

FIELD OF THE INVENTION

Embodiments of the invention relate to systems and methods for protecting data. More specifically, embodiments of the invention relate to systems and methods for securely backing up data such that the data can be both deduplicated and encrypted.

BACKGROUND

In today's world, computers and computers are ubiquitous on both personal and entity levels. The data stored in these computers is important in many ways. Consequently, it is advisable to protect the data. Of course, there are different ways to protect the data.

For instance, data could be protected at least from unauthorized use and/or from loss. Data can be encrypted, for example, in an attempt to prevent unauthorized access to the data. Of course, simply encrypting the data does not necessarily protect or prevent the data from being lost. As a result, many entities or users also backup their data to guard against loss.

A common way to protect data is to backup the data "in the cloud" such as in a datacenter. This requires a client to upload their data to the datacenter. Because the data is uploaded, however, the data is no longer directly under the client's control and there is a potential that the data may be viewed by a third party or by the backup provider.

To protect against these types of problems, clients that back up their data online or in the cloud also encrypt their data. While this may provide protection against loss and against unauthorized loss, backing up data online and/or encrypting the data can still pose problems for both the data owner and the backup provider. For example, it is more difficult to deduplicate encrypted data. Deduplicating encrypted data is more complicated when the backup provider is unable to see the data in the clear (unencrypted). At the same time, encrypted data is difficult to share. Access to the encrypted data is more difficult to establish. For example, it is difficult to share specific data without allowing access to other data.

Systems and methods are needed that allow data to be protected and that allow improved access to the data that has been backed up.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 3 illustrates an example of a manifest maintained in a datacenter;

DETAILED DESCRIPTION OF SOME EXAMPLE EMBODIMENTS

Figure 1:
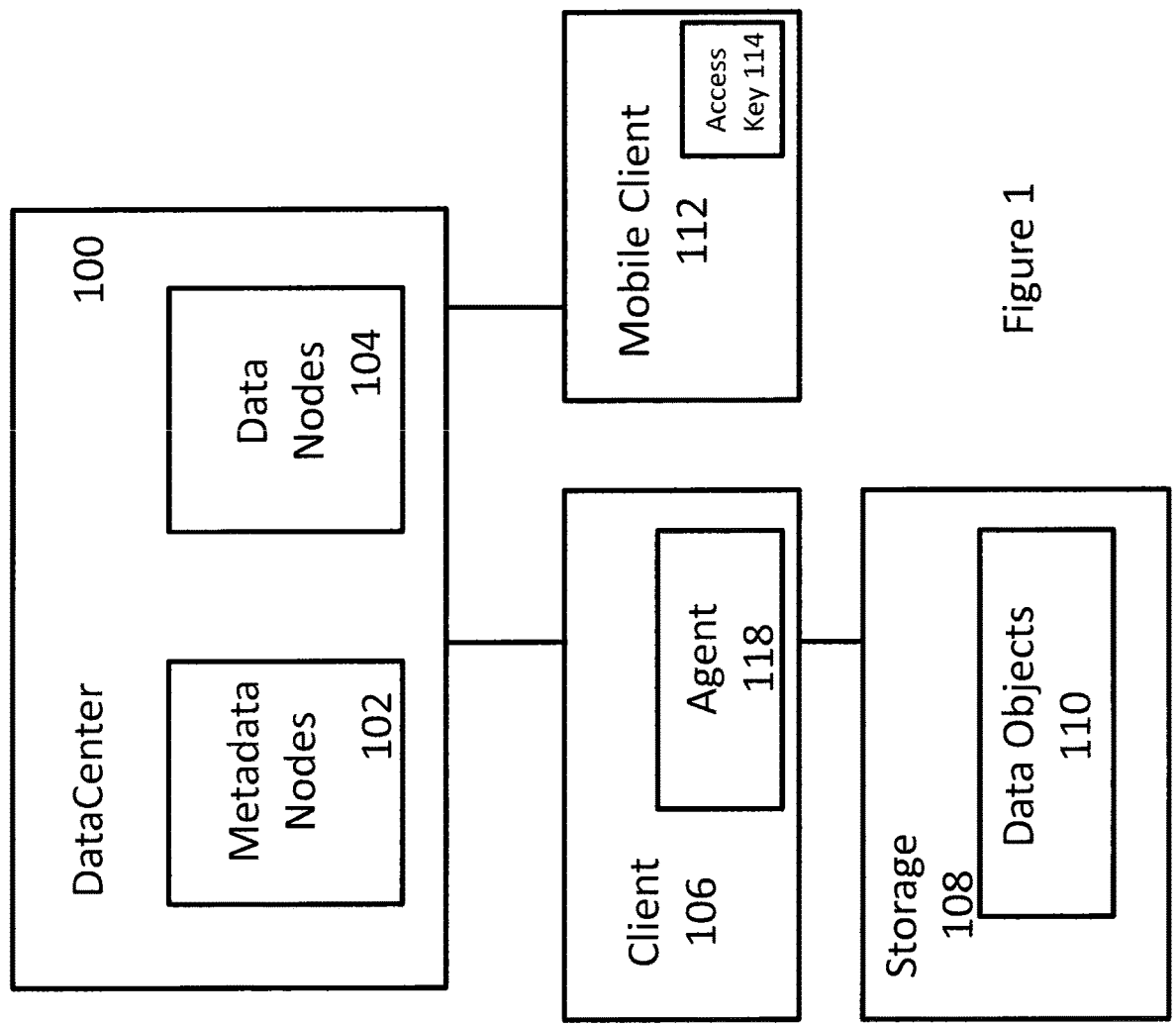
FIG. 1 illustrates an example of an environment in which data objects are encrypted and uploaded to a datacenter or other storage device.

Embodiments of the invention relate to systems and methods for protecting data such as backing up and/or encrypting data. Embodiments of the invention can provide fine-grained access to data objects that have been backed up and/or encrypted. Access can be controlled on a per block level and/or a per file level (data blocks and files are examples of data objects).

Fine-grain access can be achieved, for example, by ensuring that each data object is encrypted with a unique or different key. Although the key used to encrypt a data object can be generated randomly, the key can also be generated in a deterministic fashion. For example, the key used to encrypt the data object may be a hash (e.g., a sha value) of the unencrypted data object. The hash or sha is an example of an identifier that uniquely identifies the data object and the hash or sha of the unencrypted data object is referred to herein as a key. This key may be implemented as a symmetric key such that the key can be used to both encrypt the plain text data object and decrypt the encrypted data object. Access to the key can enable access to the unencrypted data object.

The ability to share access to the data object can be achieved by generating one or more access codes from the key of the data object. The access codes may be generated by encrypting the key with other keys. These keys are referred to, for clarity, as access keys to differentiate from keys that are generated from the unencrypted data objects. For example, different groups or users may be associated with certain access codes that are generated with their corresponding access keys. For example, an access code may be generated by encrypting the key of a data object with an access key. As a result, only the group or user that has the proper access key will be able to decrypt an access code and the decrypted access code is the key that can decrypt the encrypted data object. Much of this information (e.g., the access codes and the encrypted data objects) can be maintained or stored in the datacenter—even if the datacenter itself never has access to the data object in the clear. In some examples, certain keys may also be maintained at the datacenter.

Each data object is associated with a key and the key is the sha or hash of the plain text or unencrypted data object in one example. Because the key may be the sha of the data object, each data object may be encrypted with a different key. Because each data object can be encrypted using a different key, access to the data objects can be finely controlled. For example, anyone that ultimately gains access to a key can only have access to the corresponding data object. Providing a group or a user with the ability to decrypt an access code only allows the group or user to access to a specific data object. As a result, an owner of a data object can provide any user or group with access to specific data objects without comprising the owner's other data objects that may be stored in the datacenter.

In addition, embodiments of the invention enable rapid recovery of specific data objects when an issue arises with those data objects. For example, if a production data object (one in use by the owner) fails, then access to that same data object can be granted "in the cloud" without enabling access to any other data objects. Thus, embodiments of the invention enable access to specific data objects (e.g., files, virtual machines, servers) in the cloud or in the datacenter when necessary without necessarily providing access to all data objects stored in the datacenter.

In one example, the key generated from the unencrypted data object is used to initially encrypt the data object and may persist for the lifetime of the data object. Because a backup operation or a subsequent backup operation may include incremental backups, a particular data object may also be associated incremental changes. In one example, the same key is also associated with every change or patch to the underlying data object (e.g., the baseline of the data object). The manifest of data objects maintained in the datacenter may store this type of information such that the access codes for a given data object and/or its patches are available. A user that can decrypt the access code associated with a particular object can also access the patches associated with that data object.

When a data object is uploaded to a datacenter, the data object may be encrypted before being uploaded. This ensures that the datacenter does not have access to the data object in the clear or in an unencrypted form. The encrypted data object may be identified or associated with a fingerprint. A sha code or hash of the encrypted data object is an example of the fingerprint. In one example, the fingerprint and the key are generated in the same or similar manner.

For clarity, the key relates to or is generated from the unencrypted data object while the fingerprint relates to or is generated from the encrypted data object. When the keys and fingerprints are deterministically generated as discussed herein, duplicate data objects can be detected either before the data object is uploaded or after the data object is uploaded by comparing the fingerprints of the data objects. In other words, when the fingerprint of one encrypted data object matches the fingerprint of another encrypted data object, then the underlying encrypted data objects are the same and can be deduplicated. The data objects can be deduplicated on this basis even though the datacenter never has access to the plain text (in the clear) versions of the data objects.

Embodiments of the invention thus relate to systems and methods that generate the same key and the same fingerprint for the same data object or the same content. This allows access control and deduplication or single instance storage.

In one example, embodiments of the invention are able to encrypt data objects such that access to the data objects can be controlled on at least a file level basis and such that the data objects can be deduplicated once uploaded to the datacenter (or before uploading once the fingerprint is determined). Embodiments also allow access to data objects to be controlled on a data block level basis. In one example, data can be backed up such that the data is never in the clear to the backup provider.

The following discussion illustrates examples of filekey access. Filekey access refers, by way of example, to backing up data and/or accessing the data using keys. Filekey access can be applied to data objects and/or to data blocks. Only users with the appropriate keys or access keys are able to access the corresponding data objects.

FIG. 1 illustrates an example of an environment in which data can be protected. Protecting data includes, but is not limited to, backing up data objects, deduplicating the data objects, managing keys, operations related to the creation and management of access codes, and/or controlling or sharing access to data objects.

FIG. 1 illustrates an example of a datacenter 100. The datacenter 100 may include hardware sufficient to store data and maintain the data. The hardware may include storage devices, processors, input/output devices and the like. The datacenter 100 may be accessible over a network such as the Internet. The datacenter 100 may include multiple computing devices that may be referred to as nodes. Each node may be capable of storing data.

The datacenter 100 may be represented as including, by way of example and not limitation, metadata nodes 102 and data nodes 104. The metadata nodes 102 may be configured to store metadata such as a manifest. A manifest may include information related to the data objects 110 that have been uploaded to the datacenter 100. The manifest may include a list of data objects that have been uploaded by a client. The manifest may include, for each entry, fingerprints that uniquely identify each of the encrypted data objects, patches (which may also be encrypted) to the data object, and/or access codes associated with the data object and/or with patches to the data objects. The manifest may also include other metadata.

The data nodes 104 store the data objects and are associated with file lists. The file lists may identify what data objects are stored on the data nodes.

A client 106 is associated with a user (e.g., an owner or other authorized person) of the datacenter 100 or of services provided by the datacenter 100. The client 106 is representative of a computing device (a computing device, a server) or devices that can communicate over a network and that can upload/download the data objects 110 to/from the datacenter 100.

The client 106 may operate to process the data objects 110 prior to uploading the data objects 110 to the datacenter 100. The client 106 may include an agent 118 that may perform cryptographic functions such as performing a hash, creating a key, generating access codes, or the like. The agent 118 cooperates with the datacenter 100 to upload the data objects 110 after processing at the client 106.

Processing the data objects 110 may include, by way of example, generating keys, encrypting the data objects with the keys, generating access codes by encrypting the keys, communicating with the datacenter to determine if a data object is a duplicate based on the fingerprint prior to uploading, or the like or combination thereof.

The client 106 or other machines or users that access or interact with the data objects stored on the data nodes 104 may be required to have a key. More specifically, a user is required to have the data object's key. For some users, an access key is also required so that the key can be extracted from the access code. Thus, the data objects stored on the data nodes 104 of the data center are configured such that the data objects can only be accessed when the client attempting to access the data objects has the appropriate key. As described below, an access key is used to decrypt one of the access codes. If the decryption of the access code is successful, the client thus has the key to the encrypted data object and the client can then decrypt the encrypted data object.

FIG. 1 also illustrates a mobile client 112, which may be running on a mobile device. The mobile 122 may include hardware and/or software that enables the data objects stored on the datacenter 100 to be accessed via a mobile device. More specifically, the mobile client 112 may have access to an access key 114 that is capable of decrypting one of the access codes associated with one of the data objects. The mobile client may also be able to upload new data objects to the client's data objects stored in the datacenter 100. Thus, the mobile client 112 may also be able to generate a data object's key, generate access codes, encrypt a data object prior to upload or the like. The mobile client 112 may operate similarly to the client 106 and have the ability to browse, upload, download, and share data objects. Similarly, a client or a user with an appropriate key may be able to access the datacenter using another device or another type of connection.

As described in more detail below, a manifest associated with the data objects of the client 106 may also store a public key. In one example, the public key is associated with the manifest itself and is different from the keys of the data objects.

In one example, the public key can allow data objects to be shared. For example, a user (which may be different from the owner and may be unrelated to the owner of the manifest) could add an encrypted data object to the owner's manifest or the manifest associated with the data objects 110 by encrypting the data object with the manifest's public key.

Figure 2:
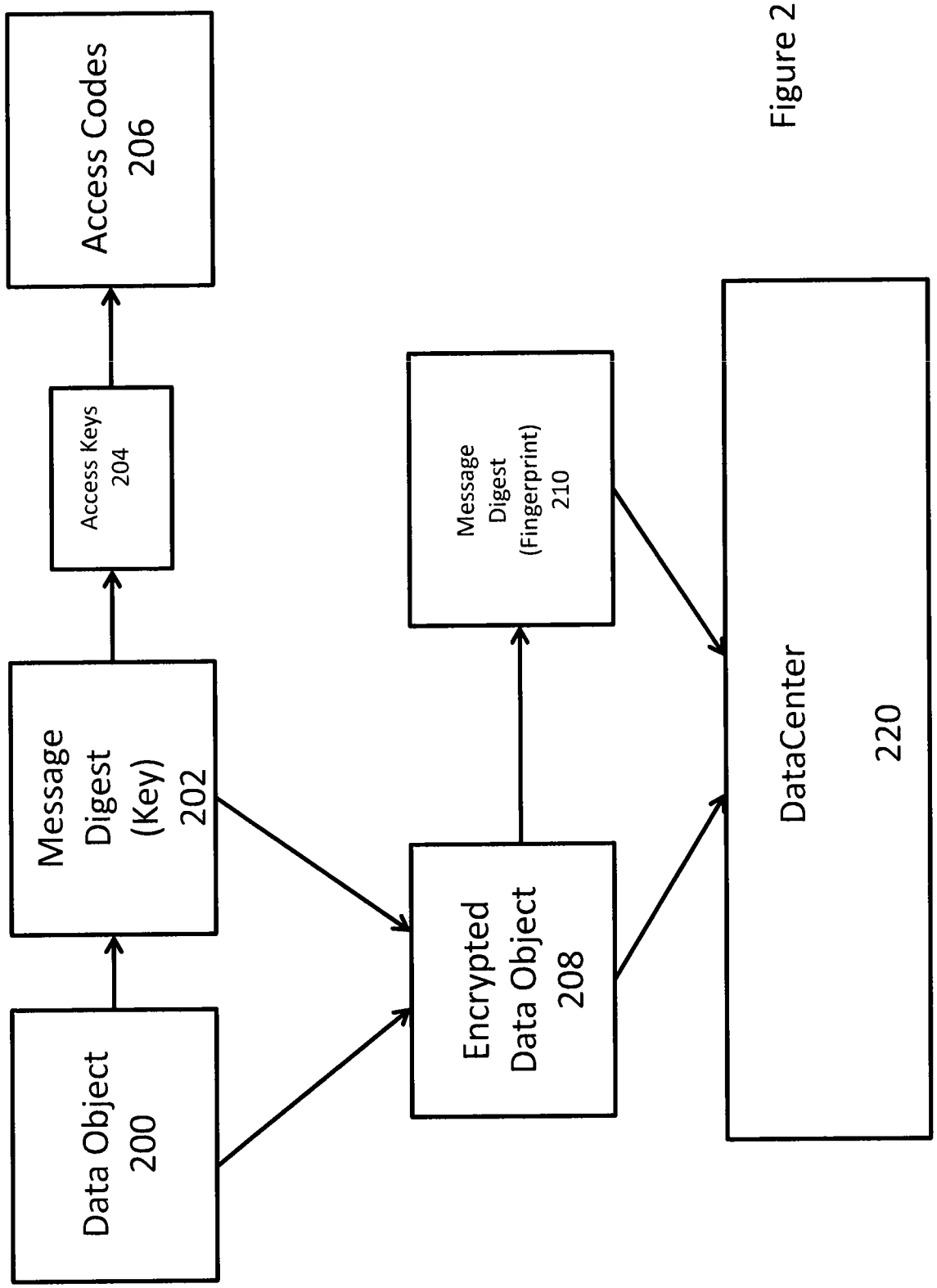
FIG. 2 illustrates an example of a data object that is encrypted and backed up in a datacenter or other storage device.

FIG. 2 is an example of a data object that is being uploaded to a datacenter. FIG. 2 illustrates a data object 200 that is uploaded in a manner that allows the data object 200 to be shared and/or such that access to the data object 200 can be controlled. The data object 200 may be stored on a storage device of or associated with a client and is being prepared for upload. In one example, a message digest 202 is generated from the data object. The message digest 202 may be a hash, for example or other identifier and is an example of a key of the data object 200. The key 202 may be used to encrypt/decrypt the data object 202. Encrypting the data object 200 with the 202 results in an encrypted data object 208.

A second message digest 210 may then be generated from the encrypted data object 208. The message digest 210 may also be a hash (e.g., a sha code) and is an example of a fingerprint. In one example, the fingerprint 210 can uniquely identify the encrypted data object 208. The encrypted data object 208 and the fingerprint 210 and the access codes 206 may be uploaded to a datacenter 220, which is an example of the datacenter 100.

In one example, the datacenter 220 does not receive the data object 200 or the key 202 in the clear. The datacenter 220, however, may receive one or more access codes 206 as previously stated, which are generated by encrypting the key 202 with one or more access keys 204. The access keys 204 may include symmetric keys and/or asymmetric keys.

In one example, the data objects of a client are each prepared and uploaded in this manner. Because the key 202 is unique to the data object 200 and functions as the key to encrypt the data object 200 (the plain text data), every key may be distinct. As a result, even if the key 202 is obtained in an unencrypted form, the other data objects stored in the datacenter 220 cannot be decrypted because they were encrypted with different keys. The keys of other data objects remain unknown and encrypted at the datacenter 220. Stated differently, every data object can be associated with its own key 202. The key 202 serves as the key to encrypt the data object and as a result, each data object is associated with a different and unique key. The key 202 can be obtained by decrypting one of the access codes 206 with an appropriate access key 204.

When a patch (e.g., an incremental change to an existing data object) is backed up, the key 202 associated with the original data object 200 is used to encrypt the patch. However, each patch could be associated with its own key as well in some embodiments. In other words, the key of the original baseline data object 200 may be used to encrypt subsequent patches of the data object 200. Subsequent patches could be encrypted with their own keys in some embodiments.

In addition, the encrypted data object 208 and the fingerprint 210 can be used to perform deduplication in the datacenter. Deduplication is possible in part because the key 202 and/or the fingerprint 210 are, by way of example, deterministically generated. If the key 202 and the fingerprint 210 are generated deterministically, then the datacenter 220 can deduplicate the data objects—even when the data objects are encrypted. More specifically, the datacenter 220 can effectively compare the data fingerprints 210 with each other to identify duplicate data objects and delete duplicates where desired if necessary. This step can be done prior to or after upload of the data object. In one example, the fingerprint 210 is generated prior to upload and can be compared to fingerprints already stored in the datacenter. If a match is found, the encrypted data object is not uploaded. This allows the datacenter to deduplicate prior to uploading.

In one example, the access codes 206 may also be uploaded to the datacenter. The access code 206 (or access codes 206) may be stored in the manifest and associated with the data object 200. By storing the access codes 206 at the datacenter, the data object 200 can be accessed when the client or user attempting to access the data object has the appropriate access key 204 that can decrypt one of the access codes. In one example, the attempt to decrypt the access code is conducted at the client such that the decrypted access code (the key of the encrypted data object) is not in the clear.

FIG. 3 illustrates an example of a datacenter 300, which is an example of the datacenter 100. After the encrypted data object (e.g., the encrypted data object 208) is uploaded to the datacenter, the encrypted data object is stored in the data nodes 310. Metadata related to the data object may be stored in a manifest 302. The manifest 302 may include information for multiple data objects. FIG. 3 illustrates some of the information for a particular encrypted data object. The manifest 302 includes an object path 304, which may include the fingerprint of the encrypted data object, access codes 306, and other metadata 314. The access codes 306 are encrypted forms of the key of the unencrypted data object. Only users or clients with the access key to decrypt the access code is able to access the unencrypted data object. The access keys necessary to decrypt the access codes 306 may or may not be available to the datacenter 300.

In one example, the manifest 302 may be associated with a specific security policy. Data objects associated with the same security policy may also be included in or identified in the manifest 302. Data objects associated with a different security policy may be associated with a different manifest. In addition, the security policies of other manifests may or may not have the same level of encryption or the same access control. For example, one security policy may be to encrypt all data objects (associated with that manifest) with the same key. Another security policy may simply have a single access code. In some examples, the manifests may be associated with each other without sacrificing their associated security policies.

The manifest may also store patch records 308 that are related to the entry of the encrypted data object. The records 308 are associated with the same access codes 306 that are based on or generated from the key of the original data object. The patch records may allow a time based restore of a data object. Over time, new baselines may be generated to the client and uploaded.

The manifest may also include key data 312. The key data 312 may identify a manifest key that is associated with the manifest 302. For example, the key data 312 may allow a client to add a data object to the manifest in a secure manner and such that only the owner of the manifest 302 is able to access the data object. If the key data 312 identifies a manifest public key, then a client could generate a key of the data object and encrypt the data object with the key. The key of this data object may then be encrypted with the manifest public key in the key data 312. In effect, this creates as access code for the owner of the manifest 302, which can be decrypted with the manifest private key, which thus allows that owner to access the data object added in this manner. This allows an unknown user and/or a known or trusted user to securely share data objects with the owner of the manifest.

Figure 4A:
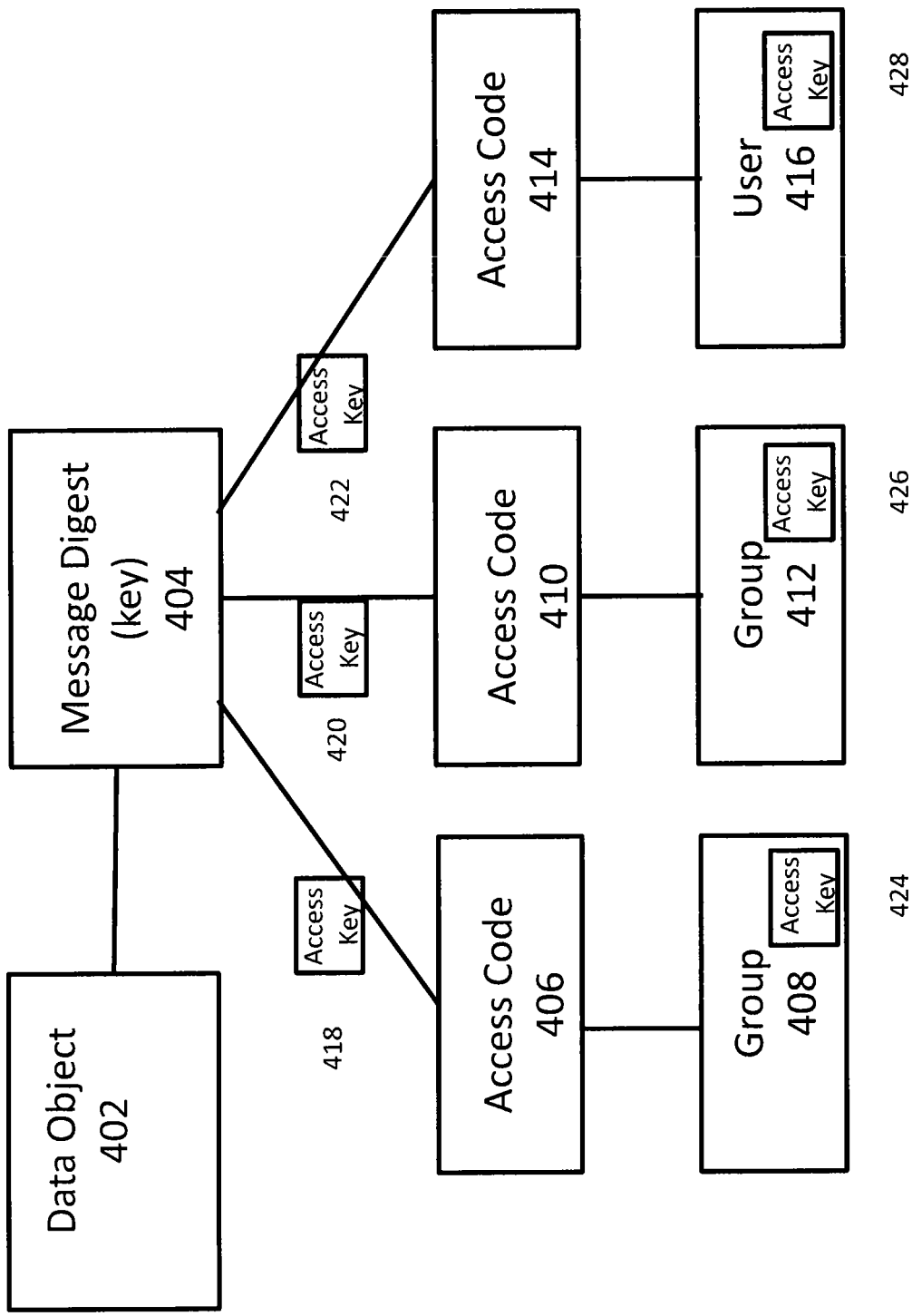
FIG. 4A illustrates and example of managing access to a data object using access codes.

FIG. 4A illustrates an example of data object sharing and more specifically illustrates the generation of access codes for data objects. FIG. 4A illustrates a data object 402. The data object 402 is associated with a key 404. The key 404 may be used to encrypt the data object 402 as previously described.

In preparation for sharing the data object, the key 404 is encrypted with one or more access keys to generate one or more access codes. In FIG. 4, the access key 418 is used to generate the access code 406, the access key 420 is used to generate the access code 410, and the access key 422 is used to generate the access code 414. The access keys 418, 420 and/or 422 may be any type of key such as symmetric and/or asymmetric keys.

In one example, the access keys 418, 420, and 422 are public access keys and are associated with, respectively, private access keys 424, 426, and 428. The access key 424 is maintained or kept secret by a group 408, the access key 426 is kept secret by the group 412, and the access key 428 is kept secret by a user 416.

As previously stated, the access codes 406, 410, and 414 may be stored in a manifest at the datacenter. When the group 408 (or an individual of the group 408) tries to access the data object 402, which is only stored on the data center in encrypted form in one example, the access key 424 allows the group 408 to decrypt the access code 406 to obtain the key 404. The key 404, which may be a symmetric key in one example, can then be used to decrypt the encrypted data object to obtain the data object 402. To keep the data from being in the clear, the decryption process may occur outside of the datacenter.

The access keys 418, 420, and 422 are examples of keys that may be stored in the key data 312 in the manifest or that are otherwise available to the client that is backing up the data or to the datacenter. In this example, three different entities are able to access the data object 402. By decrypting the corresponding access code, these entities can obtain the key 402 that encrypted the data object 402.

As explained with reference to FIG. 2, there may be a one to one relationship between a key and a data object. In other words, each data object is associated with its own key. As a result of this relationship, access to all the data objects of a client or user can be controlled on a data object level, whether the data objects are entire files or data blocks.

Figure 4B:
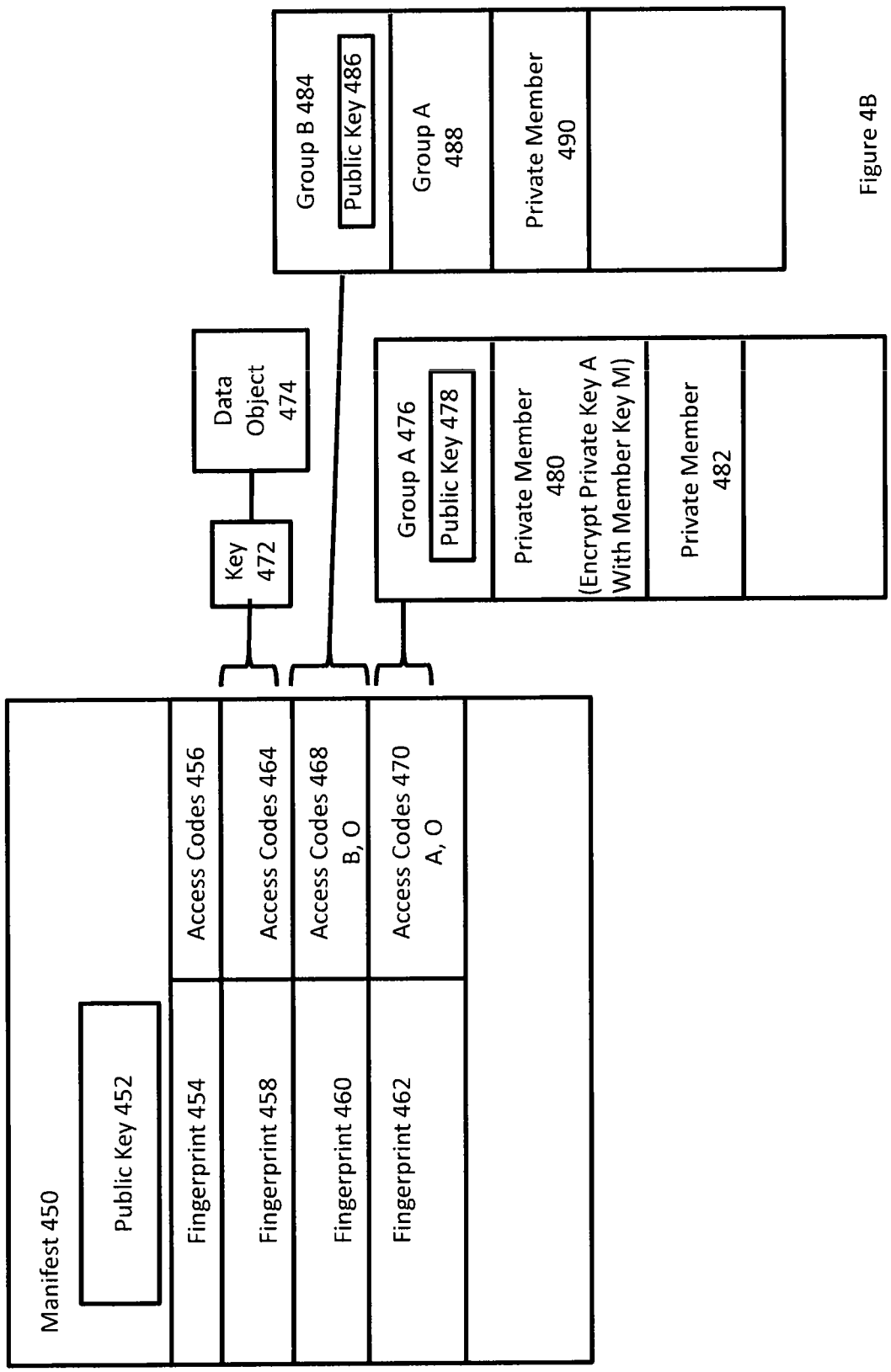
FIG. 4B illustrates an other example of controlling access to data objects using access codes.

FIG. 4B illustrates another example of controlling access to data objects. The manifest 450 includes entries or records that each include at least a path (which may include a fingerprint of an encrypted data object) and access codes associated with the encrypted data object. FIG. 4B illustrates a fingerprint 454 associated with access codes 456, a fingerprint 458 associated with access codes 464, a fingerprint 460 associated with access codes 468, and a fingerprint 462 associated with access codes 470.

As previously stated, the fingerprints are, in one example, shas or other unique identifiers of the encrypted data objects and the access codes are the encrypted versions of the key of the unencrypted data object.

FIG. 4B illustrates examples of how access to data objects can be shared and/or managed. In this example, the manifest 450 is associated with a key pair that includes a public key 452 and a private key. Any user may be able to add a data object to the datacenter such that the data object is represented in the manifest 450 and thus shared with the owner of the manifest. In one example, a user (even an untrusted user) may have a data object 474 to add to the manifest 450. The user may encrypt the data object 474 with a key 472. The key 472 may be a sha or hash of the unencrypted data object 474. The key 472 may then be encrypted with the public key 452 of the manifest 450. In this example, the public key 452 is associated with the manifest 450 or with an owner of the manifest 450.

Encrypting the key 472 of the data object with the key 452 generates an access code. The access code and the encrypted data object 474 can then be added to the datacenter. A fingerprint of the encrypted data object 474 and the access code can be stored in the manifest 450. This is illustrated as the fingerprint 458 and the access code 464. More than one access code may be present in the access codes 464 because the owner of the manifest can then generate additional access codes to share the data object 474 with other users.

Because the manifest is also associated with a private key (that is hidden from public view and that is associated with the public key 452), only the owner of the manifest can decrypt the access code 464 and gain access to the data object 474. This illustrates an example of how any user could upload a data object to be included or represented in the manifest 450.

The owner of the manifest may share access to the data object as follows. First, the owner would decrypt the access code 464 with the private key to obtain the key 472. The key 472 could then be encrypted with another user's public access key to generate another access code. This new access code can be decrypted by the user's private key, which provides the user with the key to the data object 474.

In another example, the owner or client associated with the manifest 450 may desire to share the data object associated with the data object identifier 462 with a group (Group A 476). The manifest illustrates a fingerprint 462 of an encrypted data object and access codes 470 that includes an access code A for group A 476 and an access code O for the owner. In this case, one of the access codes 470 (access code A) has been generated using the public access key 478 associated with the group A 476. This may have been performed prior to uploading the data object identified by the fingerprint 462. The membership of group A may be public and may be stored in the datacenter along with the manifest 450. The members of group A 476 can access the data object using the private key associated with the public key 478 of the group A 476. In other words, the private access key of group A can be used to decrypt one of the access codes to obtain the key of the encrypted data object.

Because a private key should be kept private, the private key of group A 476 (e.g., for the member 480) may be encrypted with a member key M of the member 480. As a result, a key chain is established that ultimately allows the member 480 to decrypt the access code A included in the access codes 470. For example, the member key M decrypts the private key A of the Group 476. The private key A is used to decrypt the access code A. The decrypted access code A is the key that can be used to decrypt the encrypted data object. Thus, the member 480 has access to the unencrypted data object. The member 482 may similarly be associated with its own member key that allows the member 482 to access the unencrypted data object in a similar manner.

FIG. 4B also illustrates another group B 484. The members of group B 484 include Group A 486 and other private members 490. Group B 484 similarly has a public key 486. The access code B included in the access codes 468 was generated using the public key 486. As a result, only members that have the private key associated with the public key 486 are able to decrypt the access code B to obtain the key necessary to gain access to the data object associated with the data object identifier 462.

FIG. 4B illustrates further that the data object 474, which may have been added by an unknown user, a known user, a trusted user, or the like, can be accessed by the owner of the manifest 450. For example, the owner of the manifest 450 may notice a new entry in the manifest that was encrypted with the public key 452. The owner can then decrypt the access code using the corresponding private key to identify the key of the new entry and decrypt the encrypted data object to obtain the data object 474. Once this has been done, the owner can now encrypt the key of the data object 474 with the public key 478 of group A 476. Thus, the owner can share the data object 474 with specific groups or users— even if the owner is not a member of the Group A and even if an owner of the data object 474 is not associated with the manifest 450 or included in group A 476. Controlling access in this manner is an example of sharing data objects.

FIGS. 4A and 4B illustrate groups can be hierarchically structured and that by tracking keys (data object keys, access keys, etc.), a user can ultimately access the appropriate data object. Embodiments of the invention, by tracking the chain of keys or by using a series of keys, enable access to data objects to be structured within an entity, between entities, with untrusted entities such that only those that should have access obtain access to the data objects. Embodiments of the invention enable a client to share and/or control access to specific data objects with trusted and/or untrusted entities.

Figure 5:
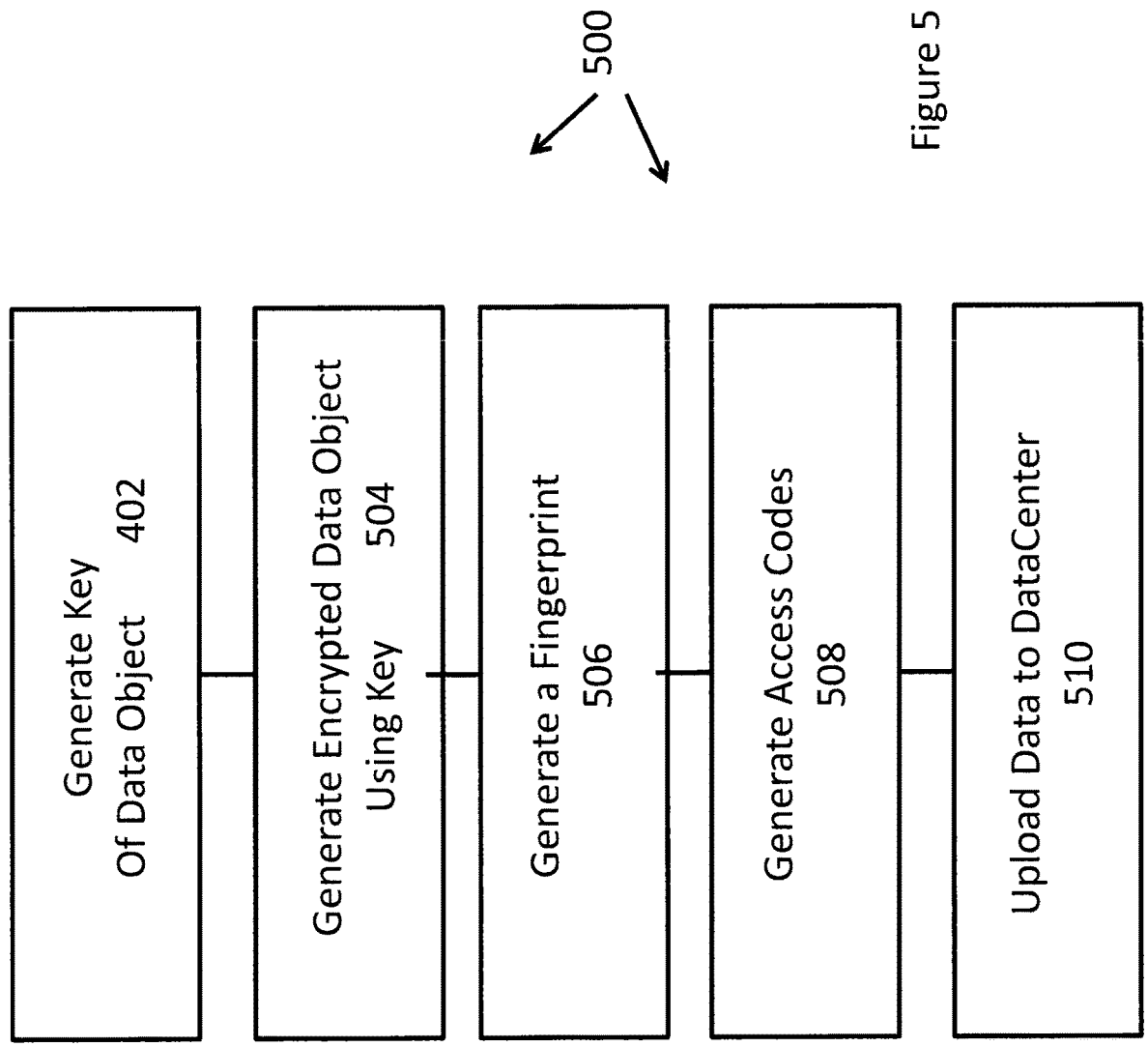
FIG. 5 illustrates an example of a method for backing up a data object.

FIG. 5 illustrates an example of a method for backing up a data object in a datacenter or other storage device. The method 500 may be performed for all data objects identified by a user or client. The method 500 can ensure that the client's data are backed up, that access to the data can be finely-controlled and shared, and that the data are never in the clear or visible in unencrypted form at the datacenter if desired.

A method 500 begins in block 502 by generating a message digest for an unencrypted data object. More specifically, a key for the data object is generated in block 502. The key may be deterministically generated such that when a key is generated for another identical data object, the same key is obtained.

In block 504, the data object is encrypted using the initial or original key. In this example, the key may be a symmetric key that can encrypt and decrypt the data object. In block 506, a fingerprint is generated. The fingerprint may also be a message digest of the encrypted data object.

In block 508, one or more access codes are generated using one or more access keys that may or may not be known to the datacenter. The access codes allow the holders of the access keys to access the unencrypted data object. As illustrated in FIGS. 4A and 4B, an access code may be generated for a group by encrypting the key of the data object with the group's public key. As structured, members of the group will be able to access the unencrypted data object by first decrypting the access code with the group's private access key to obtain the key and then decrypting the encrypted data object using the key. In addition, the group's private access key may be encrypted with the member's personal key.

As previously described, access to the client's data objects is controlled and shared by structuring the keys in this manner. The ability to share data objects with different groups or users is enhanced while still protecting other data objects from unauthorized access and while reducing the storage requirements of the datacenter by enabling deduplication.

In block 510, data is then uploaded to the datacenter. By way of example only, this data may include one or more of the encrypted data object, the fingerprint, the access codes, or the like. As previously stated, because these unique identifiers (e.g., the keys and fingerprints) are generated deterministically, the identifiers can be used to implement single instance storage even though the determination of whether data is duplicated is based on encrypted data.

Figure 6:
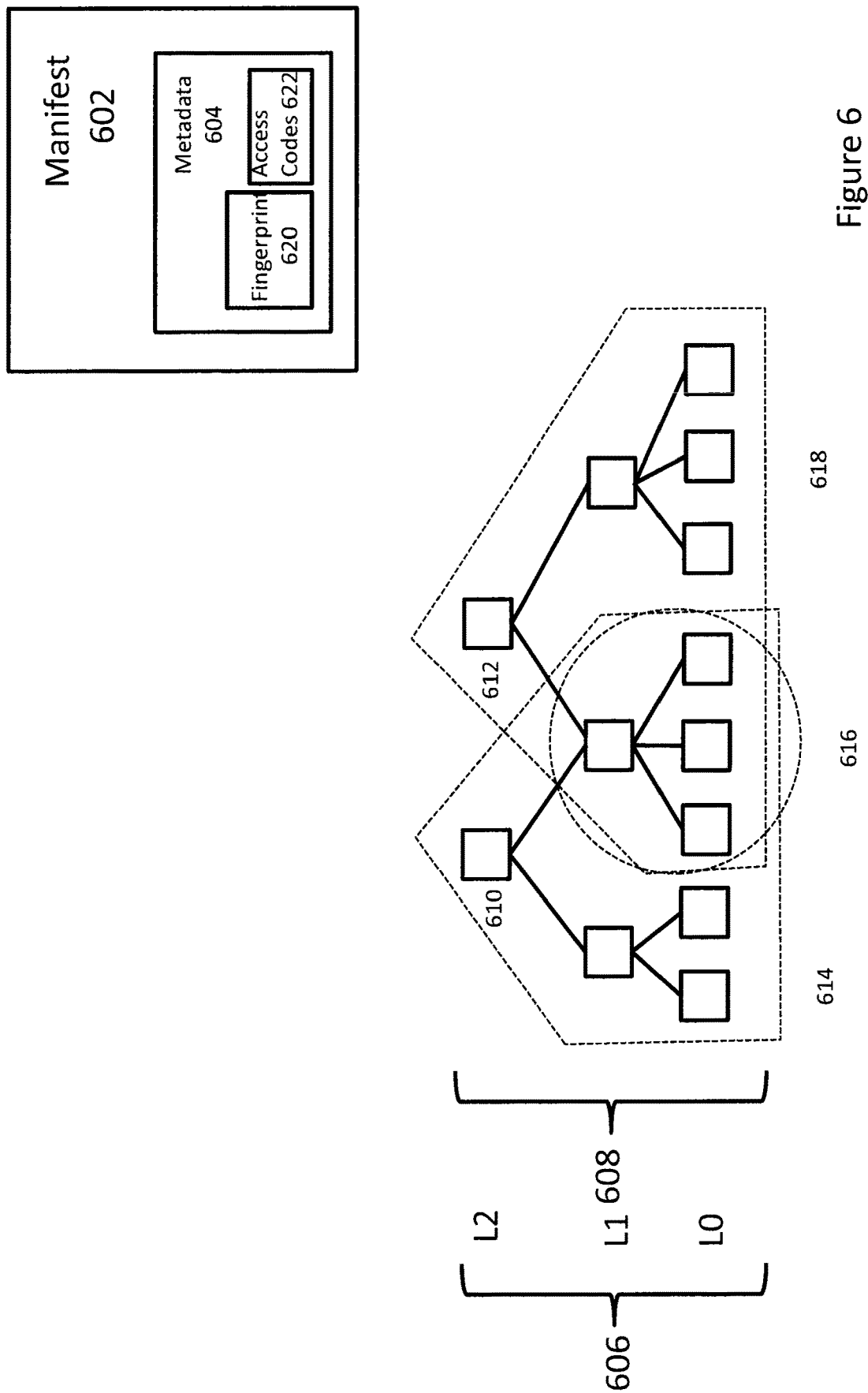
FIG. 6 illustrates an example of a data object that is backed up and deduplicated at a block level in a datacenter or other storage device.
Figure 7:
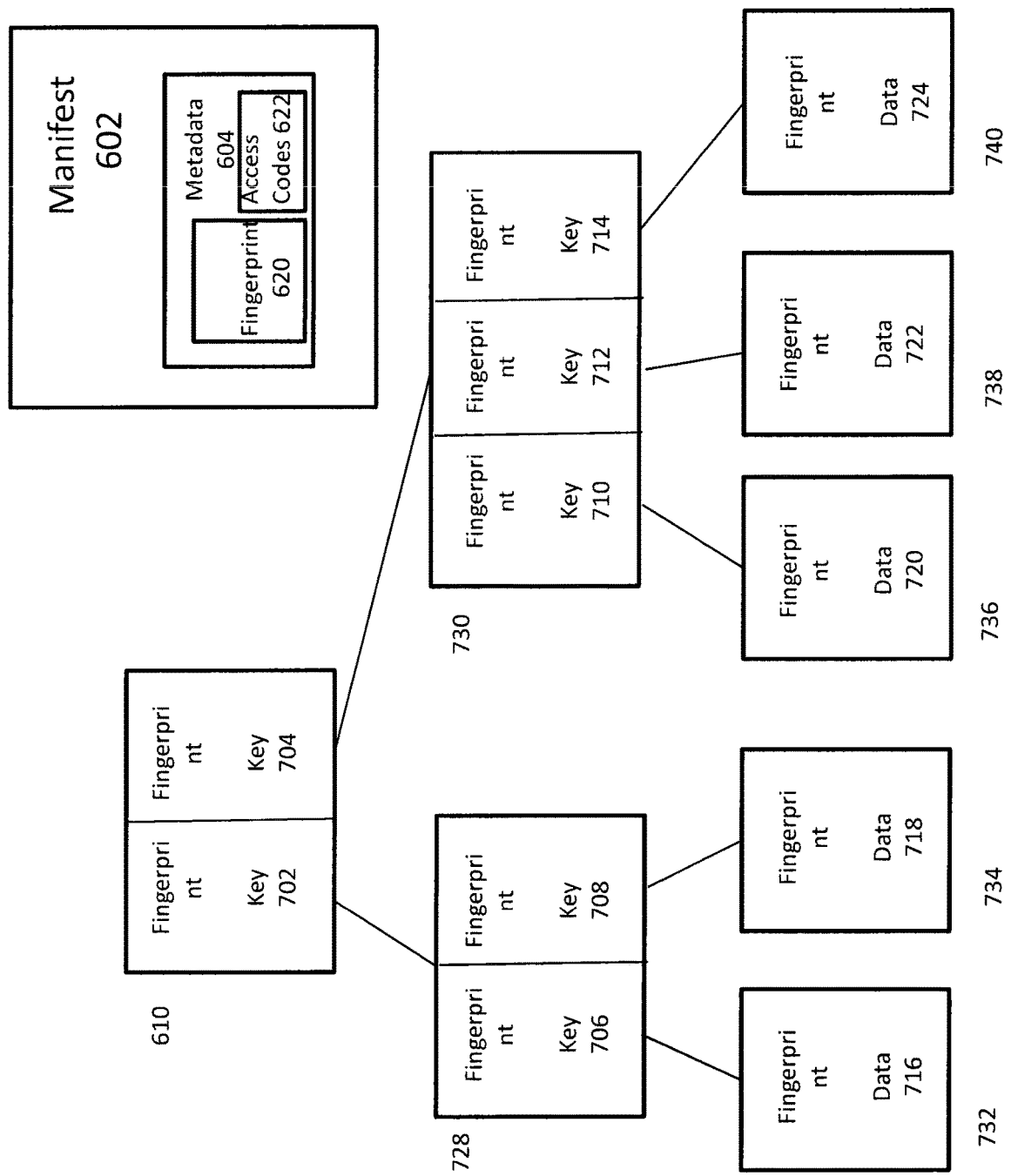
FIG. 7 illustrates an example of data blocks in a datacenter that are configured to allow controlled access to data objects and that prevent unauthorized access to the data objects.

As previously mentioned, embodiments of the invention can backup data objects at different levels. Data can be backed up, for example, at the file level or at the data block level. FIGS. 6 and 7 illustrate an example of backing up data at a data block level. Backing up data at a block level is implemented using the backup and protection operations discussed previously. In addition, backing up data at the block level enables additional savings at least in terms of storage requirements. A single block can be shared multiple times.

In one example, the data is accessed in a similar manner using filekey access. For example, a manifest stored in the datacenter contains entries. An entry may identify an initial block of, by way of example, a larger data structure such as a file (which is therefore composed of blocks). The entry or record in the manifest also includes access codes for the initial or beginning block that should be accessed in order to access the corresponding data object. In one example, the manifest may only include an entry for the initial block.

The fingerprints and access codes can be generated as discussed herein. As a result, those with the ability to decrypt the access codes or one of the access codes in the manifest entry will be able to access the initial block. The initial block contains information that leads to additional blocks and ultimately to the data blocks of the larger data structure. The blocks may be arranged in a tree type structure (e.g., a Merkle tree) in one embodiments such that the blocks may be shared in the storage or in the datacenter and such that the blocks can be deduplicated.

FIG. 6 thus illustrates an example of blocks that may be stored in a datacenter. FIG. 6 illustrates a manifest 602 that includes metadata 604. In this example, the metadata 604 includes identifier fingerprint 620 and access codes 622. The fingerprint 620 and the access codes 622 are an example or a record or entry in the manifest 602 and the manifest 602 may include multiple records or entries.

The fingerprint 620 may be a fingerprint of an encrypted block. In this example, the object identifier 620 points to or is associated with the block 610. A similar record may be present for the block 612. The access codes 622, when decrypted, each contain the key that allows the block 610 or a portion of the block 610 to be decrypted.

The block 610 thus includes similar entries of a fingerprint and key for each block that is below the block 610 in the tree structure. The entries in the block 610 may identify either branches or leaves of a tree. This pattern continues and is discussed in more detail with reference to FIG. 7.

The block 610 is a top block or a top node. As a result, following this block will lead to a unique result. All top blocks correspond to a unique data structure in one example. In this example, all of the blocks 614 are accessed through the block 610 and correspond to the data blocks of a particular data object. Similarly, all of the blocks 618 are accessed through the block 612 and correspond to the data blocks or a different data object. More specifically, this arrangement may allow certain data blocks to be found and that can be reassembled into a data object.

FIG. 6 further illustrates that the blocks 616 are shared and are therefore deduplicated. Even though the blocks 616 correspond to at least two different data objects, there is only a single instance of the blocks 616. At the same time, any user that accesses the blocks 616 corresponding to the blocks 614 will be unable to access the other blocks corresponding to the blocks 618.

FIG. 7 illustrates a more detailed example of some of the blocks illustrated in FIG. 6. FIG. 7 illustrates the blocks 614 of FIG. 6 in more detail. As previously discussed, the fingerprint 620 may be a fingerprint of an encrypted data object or of an encrypted block such as the block 610. In this sense, the block 610 is associated with a key, which key may be a hash or sha of the unencrypted block 610. The key can be encrypted with an access keys to generate the access codes 622. A fingerprint of the block 610 is determined after the block 610 is encrypted with its key. Decrypting one of the access codes 622 allows a user to decrypt the block 610 using the key obtained from the decrypted access code 622.

The block 610 may contain entries—one entry for each block in the next level for example. As illustrated in FIGS. 6 and 7, the level L2 contains the initial blocks (initial blocks may be at different levels) and the initial blocks are represented in the manifest 602 in this example. The level L1 contains the blocks 728 and 730, which are branches of the block 610.

In this example, the entry 702 contains identifier fingerprint and a key for the block 728 while the entry 704 contains a fingerprint and a key for the block 730. Because the block 610 is encrypted, decrypting the block 610 with the key from the access code 622 also decrypts the fingerprints and keys in the entries 702 and 704. As a result, only a user that can decrypt the access codes will be able to follow a chain of blocks since they are encrypted with different keys.

More specifically in one example, the block 732 is encrypted with the key in the entry 706 and the block 734 is encrypted with the key in the entry 708. Similarly, the block 728 is encrypted with the key in the entry 702 and the block 610 is encrypted by the key inside the access code 622. The blocks 736, 738, 740 are encrypted, respectively, by the keys in the entries 710, 712, and 714. The block 730 is encrypted by the key in the entry 704 and, as previously stated, the block 610 is encrypted with the key in the access code 622. The access code 622 must be decrypted before it can be used to decrypt the block 610.

As these keys are used to decrypt subsequent levels or branches of the blocks 614, the data is ultimately reached in the leafs of level L0. The leaf blocks typically include fingerprint and data, as illustrated by reference numerals 716, 718, 720, 722, and 724. Once all blocks are decrypted in this manner, the data object associated with the blocks 614 can then be accessed and reconstructed. In one example, the data in the blocks 732 and 734 may include offsets for assembly purposes.

In other example, embodiments of the invention can be used for disaster recovery or to enable continuous access to computing resources. For example, a virtual machine may be composed of one or more files and may constitute a single data object. This data object can be encrypted and uploaded to the datacenter. In accordance with the above discussion, the key is associated with the data object and the data object is encrypted with the key. Then, a certain access code may be generated for the data object by encrypting the key with an access key. If the virtual machine fails at the client, the backed up copy of the virtual machine can be brought online in the cloud or in the datacenter. The user may have the access key that obtain the key to the data object by decrypting the corresponding access code. As a result, the files of the virtual machine can be accessed and instantiated. Advantageously, the user is only grated access to the data object of the virtual machine. Other data objects cannot be accessed by the user (unless the access key is authorized to decrypt other access codes associated with other data objects or data blocks). Thus, the virtual machine can continue to be used without allowing that user to access any of the other data objects of the client. In one example, the data object embodying the virtual machine can be downloaded from the datacenter and then accessed as discussed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for controlling access to data objects of an owner stored in a datacenter, the method comprising:
    storing data objects in the datacenter, wherein each of the data objects is encrypted with a corresponding fingerprint and each of the data objects is associated with a different key;
    storing patches for the data objects, wherein each of the patches includes updates to the data objects, wherein each of the patches is associated with the same key used for a corresponding data object;
    for a specific data object included in the data objects of the owner, generating an access code for a specific user, wherein the access code is generated by encrypting a key associated with the specific object with a key associated with the specific user and the access code is associated with the fingerprint corresponding to the specific data object;
    allowing the specific user access to the specific data object and the patches associated with the specific data object when the specific user uses the access code, wherein the access code and the fingerprint allows the specific user to access the specific data object without allowing the specific user to access other data objects of the owner; and
    storing a manifest in the datacenter, wherein the manifest includes an object path and access codes;
    wherein in a manifest key is configured such that any client can add a new data object to the data objects in a secure manner, wherein only a user having access to a private portion of the manifest key is able to access the new data object.

2. The method of claim 1, further comprising generating the key associated with the specific object when the specific object is unencrypted.

3. The method of claim 2, wherein the key is a hash of the specific object when unencrypted.

4. The method of claim 2, further comprising generating the keys and encrypting the data objects with the generated keys prior to uploading the encrypted data objects to the datacenter.

5. The method of claim 1, further comprising generating fingerprints of the encrypted data objects.

6. The method of claim 1, wherein the access code is configured to grant a non-owner access to the specific data object without granting access to any of the other data objects of the owner.

7. A non-transitory computer readable medium comprising computer executable instructions for performing the method of claim 1.

8. A method for controlling access to data objects of an owner stored in a datacenter, the method comprising:
    storing data objects in the datacenter, wherein each of the data objects is encrypted with a corresponding fingerprint and each of the data objects is associated with a different key;
    storing patches for the data objects, wherein each of the patches includes updates to the data objects, wherein each of the patches is associated with their own key that is different from a key used for a corresponding data object;
    accessing a data object and a particular patch corresponding to the data object using the key associated with the data object and the fingerprint and the key associated with the particular patch corresponding to the data object; and
    storing a manifest in the datacenter, wherein the manifest includes an object path and access codes;
    wherein in a manifest key is configured such that any client can add a new data object to the data objects in a secure manner, wherein only a user having access to a private portion of the manifest key is able to access the new data object.

9. A method for controlling access to data objects of an owner stored in a datacenter, the method comprising:
    storing data objects in the datacenter in data nodes, wherein each of the data objects is encrypted with a corresponding fingerprint and each of the data objects is associated with a different key;
    storing a manifest on a manifest node in the datacenter, wherein the manifest stores metadata related to the data objects stored in the data nodes, wherein the manifest includes an object path an access code;
    adding a data object to the data objects using a manifest key, wherein the data object is encrypted with a first key and a fingerprint associated with the data object and the first key is encrypted with a manifest key associated with the manifest such that only an owner of the data objects can decrypt the added data object; and
    wherein in a manifest key is configured such that any client can add a new data object to the data objects in a secure manner, wherein only a user having access to a private portion of the manifest key is able to access the new data object.

\* \* \* \* \*